(12) United States Patent
Kuramitsu et al.

(10) Patent No.: US 10,191,201 B2
(45) Date of Patent: Jan. 29, 2019

(54) LIGHT EMITTING EMBLEM

(71) Applicant: TOYODA GOSEI CO., LTD., Kiyosu-shi (JP)

(72) Inventors: Yuki Kuramitsu, Kiyosu (JP); Hirotaka Fukui, Kiyosu (JP); Yoshiharu Tanaka, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 15/618,195

(22) Filed: Jun. 9, 2017

(65) Prior Publication Data

US 2017/0357044 A1 Dec. 14, 2017

(30) Foreign Application Priority Data

Jun. 13, 2016 (JP) .................................. 2016-117255

(51) Int. Cl.
*F21V 8/00* (2006.01)
*B60Q 1/50* (2006.01)
*B60R 13/00* (2006.01)

(52) U.S. Cl.
CPC ............. *G02B 6/005* (2013.01); *B60Q 1/50* (2013.01); *B60R 13/005* (2013.01); *G02B 6/0088* (2013.01)

(58) Field of Classification Search
CPC ........ G02B 6/005; G02B 6/0088; B60Q 1/50; B60R 13/005
See application file for complete search history.

(56) References Cited

U.S. PATENT DOCUMENTS

| | | | | |
|---|---|---|---|---|
| 6,879,354 B1* | 4/2005 | Sawayama | ........... | G02B 6/0025 349/62 |
| 2011/0273906 A1* | 11/2011 | Nichol | ................. | G02B 6/0076 362/607 |
| 2013/0107568 A1* | 5/2013 | Sato | ..................... | G02B 6/0095 362/602 |
| 2013/0155723 A1* | 6/2013 | Coleman | .............. | G02B 6/0018 362/621 |
| 2014/0022816 A1* | 1/2014 | Iwasaki | ................ | G02B 6/0041 362/606 |

(Continued)

FOREIGN PATENT DOCUMENTS

| | | |
|---|---|---|
| JP | 3169564 U | 8/2011 |
| JP | 2015-064994 A | 4/2015 |

*Primary Examiner* — Kevin Quarterman
(74) *Attorney, Agent, or Firm* — McGinn IP Law Group, PLLC

(57) ABSTRACT

A light emitting emblem includes: a board; a light source arranged at the board; a light guide plate having a second peripheral edge and an inner side portion, the second peripheral edge having a first surface facing the light source and a second surface opposite to the first surface, the first surface including a light entering part into which light from the light source is incident, and the second surface including an inclination part through which the light incident into the light entering part is reflected to the inner side portion from the second peripheral edge; and a shielding plate that shields the light from the light source and prevents light not incident from the light entering part from being incident into the inner side portion, wherein the inclination part is positioned at an outer edge of the light emitting emblem from the shielding plate.

15 Claims, 6 Drawing Sheets

(56) References Cited

U.S. PATENT DOCUMENTS

2015/0070593 A1\* 3/2015 Shimizu ............... G02B 6/0061
  348/794
2017/0038515 A1\* 2/2017 Yuki .................... G02B 6/0036
2018/0045881 A1\* 2/2018 Gotou .................. G02B 6/0091

\* cited by examiner

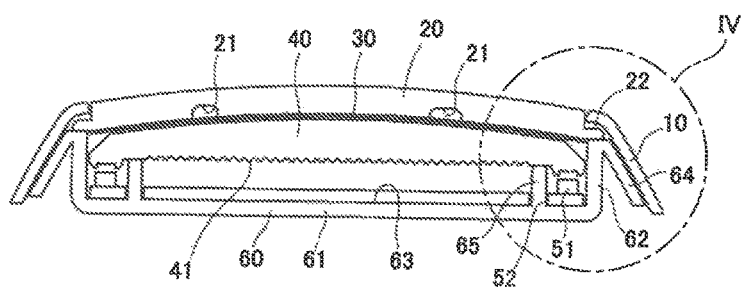
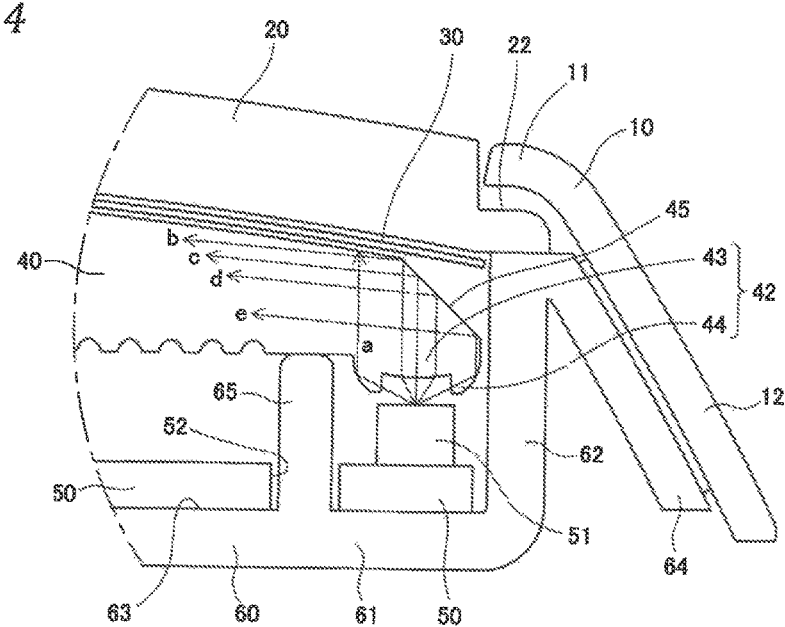

LIGHT EMITTING EMBLEM

CROSS-REFERENCE TO RELATED APPLICATION(S)

This application is based upon and claims the benefit of priority from Japanese Patent Application No. 2016-117255, filed on Jun. 13, 2016, the entire contents of which are incorporated herein by reference.

BACKGROUND

1. Field of the Invention

The present invention relates to a light emitting emblem.

2. Description of the Related Art

In order to allow an emblem provided to a vehicle such as an automobile to be visually recognizable even at night or to improve a design property of the emblem at night, a configuration is employed in which an ornament is formed by light transmitting decoration and a backlight is arranged at a rear side of the ornament. As one of such a configuration, JP-UM-Y-3169564 discloses an LED light emitting emblem. The LED light emitting emblem illustrated in FIG. 2 of JP-UM-Y-3169564 includes a flat casing capable of forming a space below an emblem body in the state in which the emblem body is placed, an LED light source stalled on an inner peripheral surface of the casing, and a diffusion plate installed between the LED light source and the emblem body, wherein the LED light source is installed to have directivity parallel to the bottom surface of the casing.

According to the aforementioned configuration, light from the LED light source stalled on the inner peripheral surface of the casing is irradiated toward the space formed by the emblem body and the casing, and is reflected in the space to be discharged to an exterior of the emblem body through the diffusion plate. The configuration illustrated in FIG. 2 of JP-UM-Y-3169564 intends to alleviate the directivity of the LED by the reflection of the light in the aforementioned space and to further alleviate the directivity by the diffusion plate. The configuration also intends to efficiently disperse the light over an entire area of the emblem body by installing the LED light source on the inner peripheral surface of the casing.

However, in the configuration illustrated in FIG. 2 of JP-UM-Y-3169564, since the extension direction of an LED board coincides with a depth direction (that is, a thickness direction) of the LED light emitting emblem, a depth dimension (that is, a thickness) of the LED light emitting emblem is increased, so that it is probable that the design property of the emblem will be deteriorated.

FIG. 2 of JP-A-2015-64994 illustrates a configuration in which an optical axis of an LED serving as a light source forms an angle near a right angle with respect to the extension direction of a light guide plate. When the configuration of JP-A-2015-64994 is applied to a light emitting emblem, the extension direction of the LED board can be allowed to be approximate to the extension direction of the light emitting emblem.

However, since the protruding height of a light incident part of JP-A-2015-64994 from a straight part of the light guide plate is relatively large, when the configuration of JP-A-2015-64994 is applied to the light emitting emblem as it is, the depth dimension (that is, the thickness) of the light emitting emblem is increased, so that it is probable that its design property will be deteriorated.

SUMMARY

The present invention has been made to solve the above-described problem, and an object of the present invention is to provide a thin light emitting emblem capable of performing light emission with high uniformity.

Inventors of the present invention have arrived at the following each aspect of the present invention as a result of intensive study for solving the aforementioned problem.

According to an aspect of the invention, there is provided a light emitting emblem including: a hoard having a first peripheral edge; a light source arranged at the first peripheral edge; a light guide plate having a second peripheral edge and an inner side portion, the second peripheral edge having a first surface facing the light source and a second surface opposite to the first surface, the first surface including a light entering part into which light from the light source is incident, and the second surface including an inclination part through which the light incident into the light entering part is reflected to the inner side portion from the second peripheral edge; and a shielding plate that shields the light from the light source and prevents light not incident from the light entering part from being incident into the inner side portion, wherein the inclination part is positioned at an outer edge of the light emitting emblem from the shielding plate.

According to the light emitting emblem of the aforementioned aspect, since the light guide plate has the light entering part facing the light source on the first surface of the peripheral edge thereof and the inclination part on the second surface of an opposite side, light incident into the light entering part from the light source can be propagated to an inner side portion (that is, a part including a central vicinity except for the peripheral edge of the light guide plate) of the light guide plate by the inclination part. Therefore, it is possible to provide a thin light emitting emblem capable of performing light emission with high uniformity. The inclination part is positioned at an outer edge of the light emitting emblem from the shielding plate. As described above, the inclination part is prevented from extending to a side near the center of the light emitting emblem from the shielding plate, so that it is possible to reduce the dimension in the thickness direction of the light guide plate. Consequently, it is possible to provide a thin light emitting emblem.

According to the light emitting emblem of the present invention, the light entering part has a convex portion and a reflection portion, which is installed around the convex portion and reflects the light incident from the light source. Thus, for example, light entering from the light source through the light entering part can be configured to be approximate parallel light in the light guide plate. The light entering part is positioned at the outer edge of the light emitting emblem from the shielding plate. Thereby, it is possible to prevent the light source from being visually recognized from a specific direction.

According to the light emitting emblem of the present invention, the inclination part and the reflection portion are directly continuous. Thus, it is possible to suppress the protruding height of the light entering part and to reduce the dimension in the thickness direction of the light guide plate. Consequently, it is possible to provide a thin light emitting emblem.

According to the light emitting emblem of the present invention, the shielding plate abuts on the light guide plate.

In this way, the shielding plate can also serve as a support element of the light guide plate.

According to the light emitting emblem of the present invention, the aforementioned light emitting emblem further includes a housing provided with the shielding plate and the board has a through hole into which the shielding plate is inserted. According to such a configuration, the shielding plate is inserted into the through hole, so that it is possible to perform positioning of the board, whereby uniformity of light emission can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 3 is a sectional view taken along one-dot chain line III-III of the light emitting emblem of FIG. 1;

FIG. 4 is a sectional view illustrating main elements of the light emitting emblem of FIG. 1;

FIGS. 7A and 7B are views illustrating a light guide plate of the light emitting emblem of FIG. 1, wherein FIG. 7A is a front view and FIG. 7B is a rear view;

DETAILED DESCRIPTION OF THE INVENTION

Figure 1:
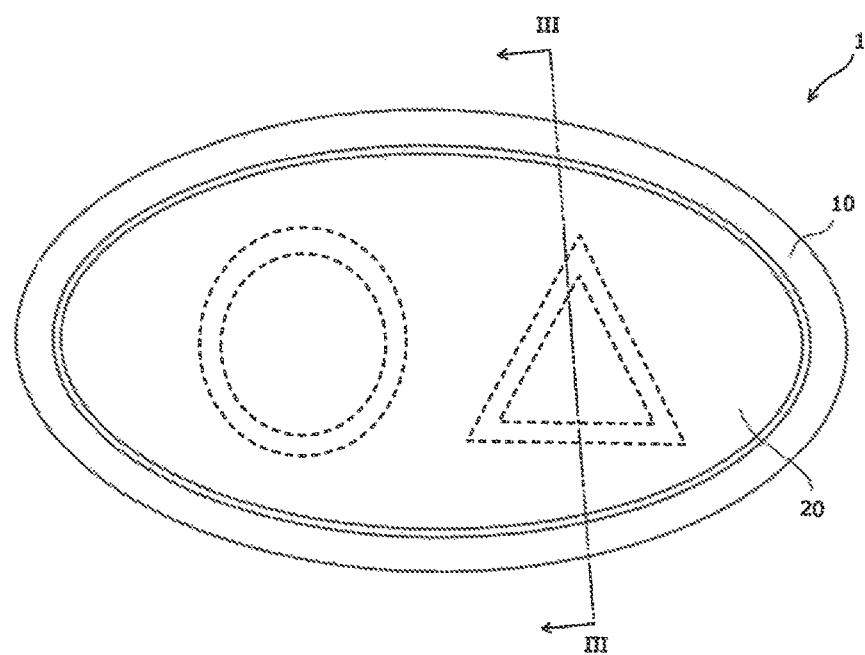
FIG. 1 is a front view of a light emitting emblem according to one embodiment of the present invention.
Figure 2:
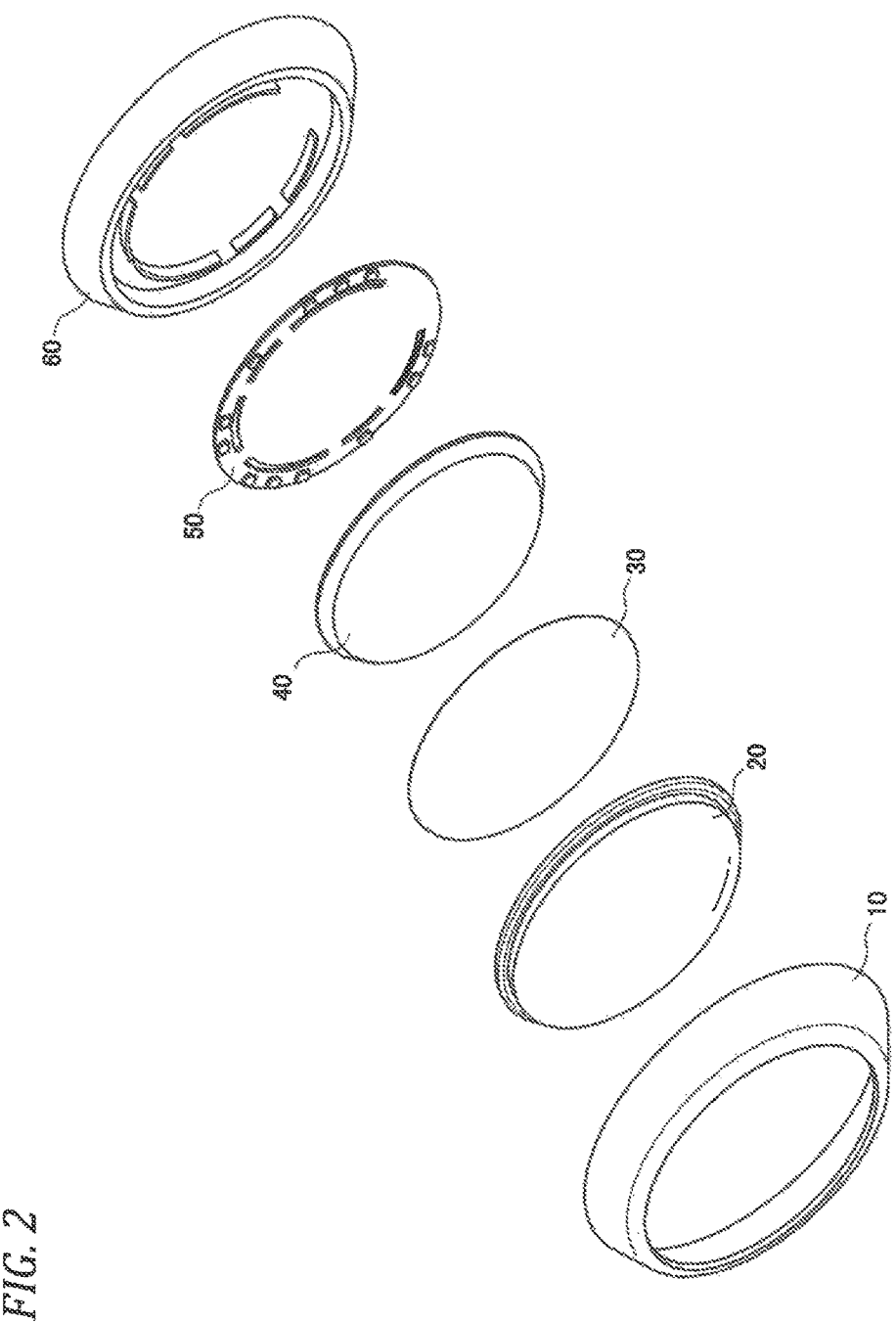
FIG. 2 is an exploded perspective view of the light emitting emblem of FIG. 1.

Hereinafter, a light emitting emblem 1 according to one embodiment of the present invention will be described with reference to the accompanying drawings. FIG. 1 is a front view of the light emitting emblem 1 according to the embodiment, and the light emitting emblem 1 of the present example is mounted in a vehicle such as an automobile to display a name and a logo mark of a maker, a vehicle name, a grade and the like (hereinafter, these are generically referred to as a "mark"). FIG. 1 schematically illustrates marks by a circle and a triangle indicated by broken lines. FIG. 2 is an exploded perspective view of the light emitting emblem 1 and FIG. 3 is a sectional view taken along one-dot chain line III-III of the light emitting emblem 1 of FIG. 1. As illustrated in these drawings, the light emitting emblem 1 of the present example is obtained by overlappingly combining a frame body 10, an ornament 20 (a decoration body), a sheet 30, a light guide plate 40, a hoard 50, and a housing 60 with one another, and its entire shape is approximately flat. In FIG. 2, the marks are not illustrated. The housing 60, for example, is mounted in a radiator grille of a vehicle. A mounting structure of a screw, a screw hole and the like for mounting the light emitting emblem 1 on a vehicle, and a structure for receiving power from a vehicle are not illustrated. The outer peripheral shape of the illustrated light emitting emblem 1 is an oval shape; however, this is an illustrative purpose only and the present invention is not limited thereto.

Figure 5:
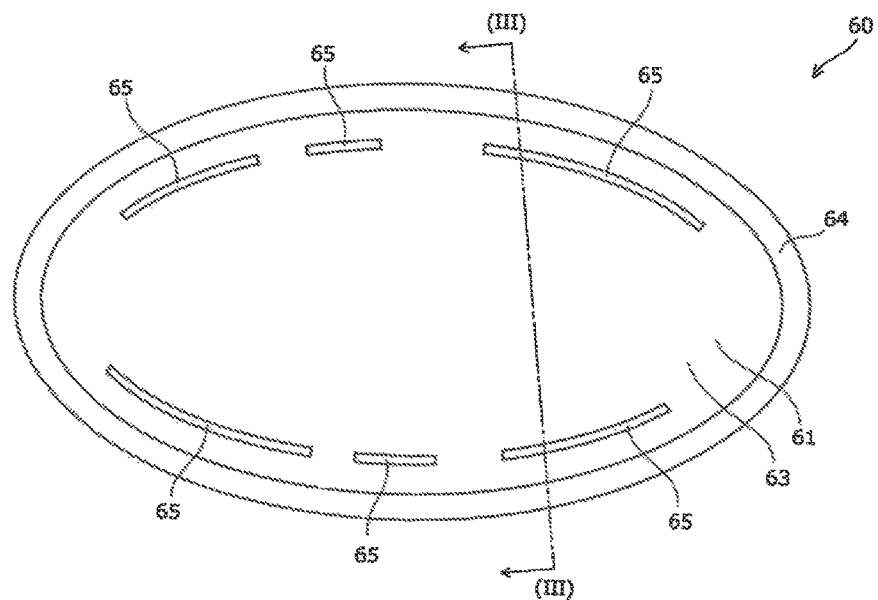
FIG. 5 is a front view of a housing of the light emitting emblem of FIG. 1.

FIG. 5 is a front view of the housing 60. The housing 60 is made of non-translucent synthetic resin (for example, AES resin, ABS resin, AS A resin, PC resin and the like), and has a bottom surface part 61 serving as a mounting surface to a vehicle and a wall part 62 vertically installed at the peripheral edge thereof as illustrated in FIGS. 3 and 5, wherein a concave part 63 is defined by the bottom surface part 61 and the wall part 62. A frame body mounting part 64 is formed in eaves shape inclined in a mounting direction (a downward direction in FIG. 3 and hereinafter, referred to as a "mounting direction") to a vehicle and in an outward direction from an outer part of a tip end portion of the wall part 62 opposite to the bottom surface part 61. At a surface (an upper surface in FIG. 3) opposite to the mounting direction of the bottom surface part 61, a plurality of (six in the illustrated example) shielding plates 65 are vertically installed to extend along the wall part 62 in the vicinity of the wall part 62. One-dot chain line (III)-(III) of FIG. 5 indicates a position through which the one-dot chain line III-III of FIG. 1 passes (the same is also in FIGS. 6 and 7A).

Figure 6:
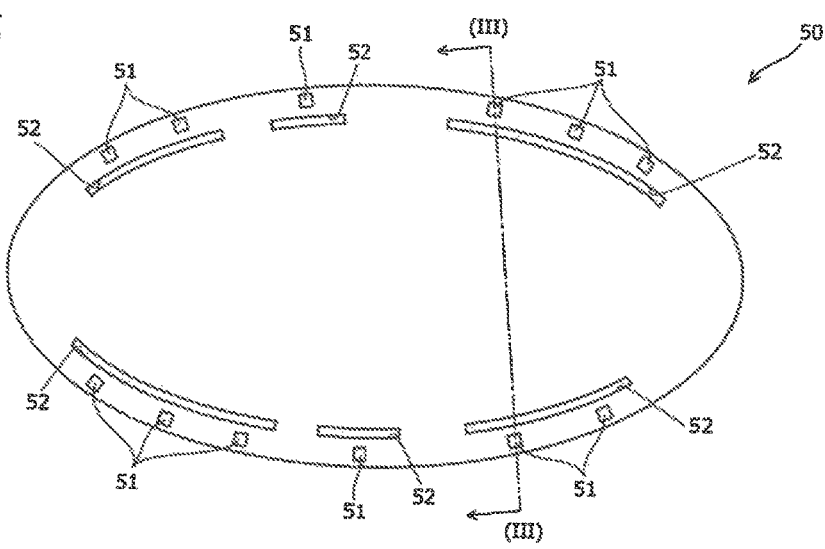
FIG. 6 is a front view of a board of the light emitting emblem of FIG. 1.

FIG. 6 is a front view of the hoard 50. The board 50 is a wiring board provided on the surface thereof with a wiring, such as a glass epoxy board and a flexible board. The wiring on the board 50 is not illustrated. An outer peripheral shape of the hoard 50 is a shape following the inner peripheral shape of the wall part 62 of the housing 60, so that the board 50 is received in the concave part 63 of the housing 60 and is installed on the bottom surface part 61. In the vicinity of a peripheral edge of the board 50, a plurality of (12 in the illustrated example) LEDs 51 are distributed and mounted at predetermined positions along a circumferential direction of the hoard 50. In the hoard 50, a plurality of (6 in the illustrated example) through holes 52 (slits) are formed inside the places, where the LEDs 51 are arranged, in proximity to the LEDs 51 so as to extend along the circumferential direction. One through hole 52 is formed for one LED 51 or a plurality of LEDs 51. Each through hole 52 is formed to cross a line segment linking a corresponding LED 51 to a central vicinity of the board 50. These plurality of through holes 52 are formed to have positions and shapes corresponding to the plurality of shielding plates 65 of the housing 60. Thus, when the board 50 is installed in the concave part 63 of the housing 60, the shielding plates 65 of the housing 60 can be respectively inserted into corresponding through holes 52 of the board 50. In this way, there is an effect that positioning of the board 50 with respect to the housing 60 is achieved.

Figure 7A:
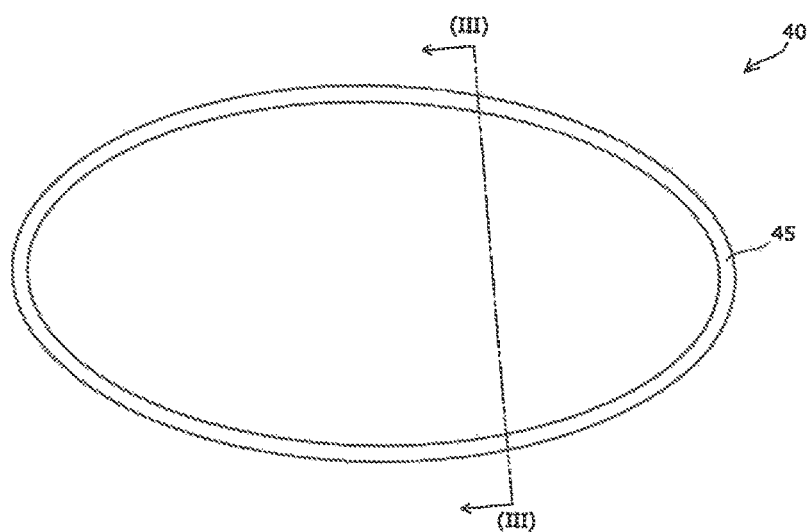
Figure 7B:
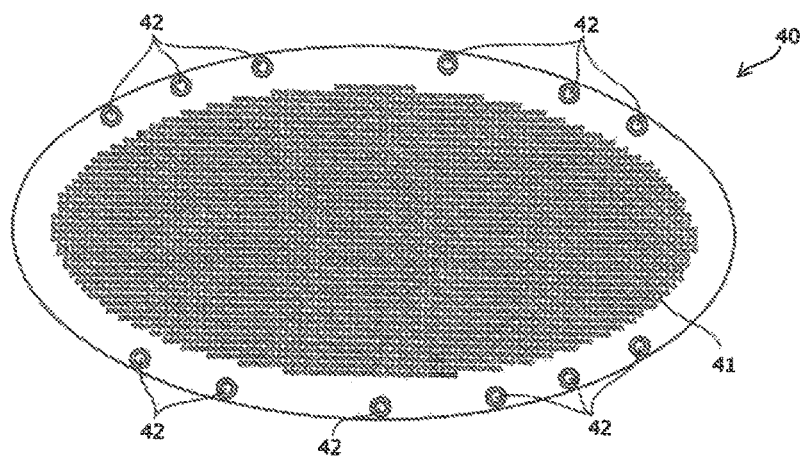

FIGS. 7A and 7B are views illustrating the light guide plate 40 of the light emitting emblem of FIG. 1, wherein FIG. 7A is a front view and FIG. 7B is a rear view. The light guide plate 40 is a member made of transparent resin (for example, acryl resin, PC resin and the like) and having an overall flat shape. The light guide plate 40 has art outer peripheral shape following the inner periphery of the wall part 62 of the housing 60 and is received in the concave part 63 of the housing 60. In this case, a surface (hereinafter, referred to as a "rear surface") of the light guide plate 40, which faces the board 50 side, abuts on the tip ends of the plurality of shielding plates 65 of the housing 60, which protrude from the plurality of through holes 52 of the board 50, so that the surface is supported. A large number of fine concave parts 41 are formed at a part of the rear surface of the light guide plate 40, which excludes the part abutting on at least the shielding plates 65 and includes the central vicinity of the light guide plate 40. Light entering parts 42 corresponding to the respective LEDs 51 are protrudingly provided at parts of the rear surface of the light guide plate 40, which face the plurality of LEDs 51. As illustrated in FIG. 4 obtained by enlarging the range surrounded by one-dot chain line IV of FIG. 3 and FIG. 7B, each light entering part 42 has a central convex portion 43 and a reflection portion 44 protrudingly provided around the central convex portion 43 in a circular shape. An inclination part 45 is formed at the peripheral edge of a surface (hereinafter, referred to as a "front surface") opposite to the LED 51 of the light guide plate 40, and is inclined to be proximate to the board 50 side toward the outer peripheral side of the light guide plate 40.

Referring to FIG. 3, the sheet 30 is made of transparent synthetic resin (for example, PC resin, PMMA resin, PET resin and the like) and is subjected to various types of decoration processing (for example, coloring treatment, half-mirror treatment, pattern printing and the like). The sheet 30 is arranged on the front surface of the light guide plate 40.

The ornament 20 is provided on a surface (a rear surface) thereof serving as a rear side after assembling with engraved parts 21 having a mark shape. The peripheral edge of the rear surface of the ornament 20 is bonded to a tip end surface of the wall part 62 of the housing 60. The ornament 20 and the housing 60 are bonded to each other, so that a box shape is achieved. As the bonding method, welding such as ultrasonic welding or laser welding, adhesion by a hot melt or an adhesive, and the like can be exemplified. The rear surface of the ornament 20, except for the bonding part, is subjected to various types of decoration processing (for example, coloring treatment, half-mirror treatment, pattern printing and the like). The sheet 30 is interposed between the ornament 20 and the light guide plate 40. At the peripheral edge of the surface (the front surface) of the ornament 20, which serves as the surface side after assembling, stepped parts 22 are formed.

By changing the degree of transmission of decoration of a part overlapping at least the LED 51, which is the peripheral edge of at least one of the ornament 20 and the sheet 30, and the vicinity thereof (for example, lowering transmittance or increasing opaqueness), the LED 51 is concealed.

The entire shape of the frame body 10 is a circular shape, and more specifically, the frame body 10 includes a circular part 11 on the inner peripheral side, which overlaps the stepped parts 22 of the ornament 20, and a cover part 12 extending in an inclination shape outward from the circular part 11. The cover part 12 has a shape following the frame body mounting part 64 of the housing 60, and at the time of assembling, the cover part 12 and the frame body mounting part 64 adhere to each other by a double-sided tape and the like. Alternatively, the cover part 12 may be formed in a cylindrical shape without forming the frame body mounting part 64, and its inner peripheral surface may adhere to the outer peripheral surface of the wall part 62 of the housing 60.

(Description of Functions of Light Emitting Emblem 1)

Next, the functions of the light emitting emblem 1 after assembling completion will be described with reference to mainly FIGS. 3 and 4. An optical axis of the LED 51 is directed to the light entering part 42 side of the light guide plate 40. Light emitted from the LED 51 after activation of the LED 51 enters into the light guide plate 40 through the light entering part 42. More specifically, the LED 51 is arranged at a focal point of the convex portion 43 of the light entering part 42, and as exemplified by arrows b, c, and d in FIG. 4, the light incident into the convex portion 43 becomes an approximate parallel light in the light guide plate 40.

The inner peripheral surface of the reflection portion 44 of the light entering part 42 serves as a light incidence surface and the outer peripheral surface thereof serves as a reflection surface. As exemplified by arrows a and e in FIG. 4, the light incident into the incidence surface of the reflection portion 44 is reflected (or is totally reflected) by the reflection surface, so that the light becomes an approximate parallel light in the light guide plate 40 with respect to the light incident into the convex portion 43.

As exemplified by arrows b, c, d and e in FIG. 4, a part of the light entered into the light guide plate 40 through the light entering part 42 is reflected (or is totally reflected) in a horizontal direction with respect to the optical axis inclination part 45 serving as a reflection surface. In order to enable the reflection (or the total reflection) by the inclination part 45, for example, the inclination part 45 is formed to have an inclination angle of about 45° with respect to the optical axis of the LED 51. In this way, light toward the inner side portion (that is, a part including the central vicinity except for the peripheral edge) of the light guide plate 40 is sent to the outside from the front surface of the light guide plate 40, or is reflected by the large number of fine concave parts 41 formed at the rear surface and then is sent to the outside from the front surface of the light guide plate 40, and is emitted to an exterior from the front surface of the light emitting emblem 1 by passing through the sheet 30 and the ornament 20.

As exemplified by the arrow a in FIG. 4, a part of the light entered into the light guide plate 40 from the light entering part 42 is sent to the outside from the front surface of the light guide plate 40 without abutting on the inclination part 45. As described above, by changing the degree of transmission of the decoration of the part overlapping the LED 51, which is the peripheral edge of at least one of the ornament 20 and the sheet 30, and the vicinity thereof, the light is suppressed from being leaked to an exterior of the light emitting emblem 1.

As described above, as illustrated in FIGS. 3 and 4, the shielding plate 65 of the housing 60 is inserted into the through hole 52 of the board 50. Thus, the shielding plate 65 is arranged in the vicinity of the LED 51 and inside (the side near the center of) the light emitting emblem 1 from the LED 51. Thereby, the LED 51 is prevented from being visually recognized through the transparent parts of the ornament 20 and the sheet 30 from the outside of the light emitting emblem 1. Each shielding plate 65 extends to cross a direction toward the center of the light emitting emblem 1 from the LED 51. Thus, it is possible to enhance the visual recognition prevention effect of the LED 51.

As illustrated in FIG. 4, the inner end portion (the left end portion in FIG. 4) of the inclination part 45 is positioned at an outer side (that is, a more peripheral edge side, and the right side in FIG. 4) from the shielding plate 65. As described above, the dimension of the inclination part 45 is allowed to be relatively small such that the inclination part 45 does not extend inward more than the shielding plate 65, so that it is possible to reduce the dimension in the thickness direction of the light guide plate 40. At the peripheral edge side of the light guide plate 40, the inclination part 45 and the reflection portion 44 of the light entering part 42 are directly continuous. Even in this way, it is possible to reduce the dimension in the thickness direction of the light guide plate 40. Consequently, it is possible to reduce the dimension in the thickness direction of the light emitting emblem 1, so that its design property is improved and it can also be installed in a vehicle with a strict limitation in a space.

Modification Example

Figure 8:
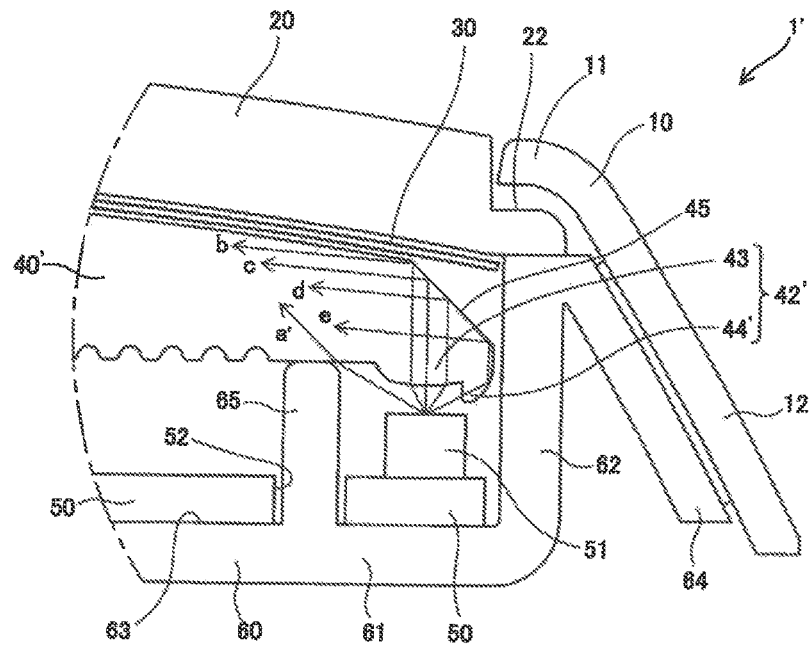
FIG. 8 is a sectional view illustrating main elements of a light emitting emblem according to a modification example of the embodiment.
Figure 9:
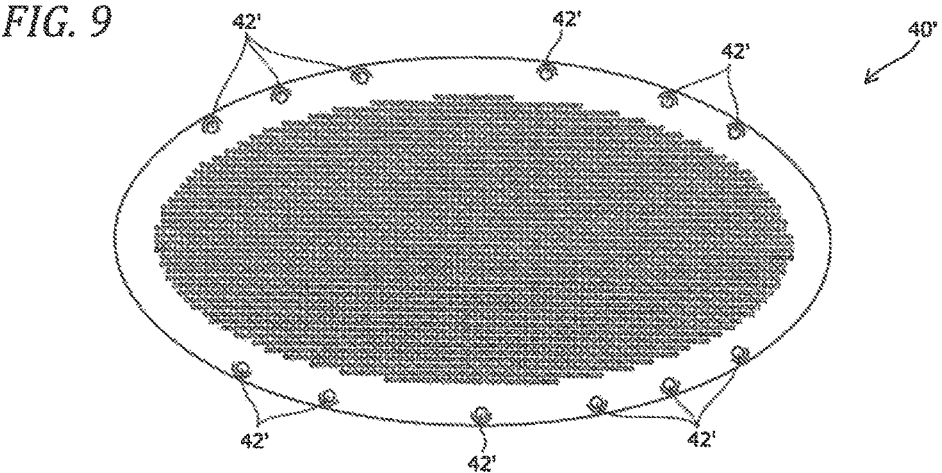
FIG. 9 is a rear view illustrating a light guide plate of the light emitting emblem according to the modification example.

FIG. 8 is a sectional view illustrating main elements of a light emitting emblem 1' according to a modification example of the embodiment, and FIG. 9 is a rear view of a light guide plate 40' of the light emitting emblem 1'. FIG. 8 is a view replacing FIG. 4 of the embodiment. As illustrated in FIGS. 8 and 9, in the light guide plate 40' of the modification example, the shape of a light entering part 42' is different from that of the light entering part 42 of the embodiment. More specifically, in the modification example, a reflection portion 44' is provided only at a position serving as an outer peripheral side of the light guide plate 40' from the center of the convex portion 43 of the light entering part 42', and is not provided at a position serving as the center side of the light guide plate 40'. By so doing, as exemplified by the arrow a' in FIG. 8, light incident into the light guide plate 40' inward from the convex portion 43 can also be used for light emission of the light emitting emblem 1'.

The present invention is not limited to the description of the aforementioned aspect, the aforementioned embodiment, and the aforementioned modification example. The present invention also includes various modification examples in the range, which can be easily achieved by a person skilled in the art, without departing from the scope of claims. The entire content of gazettes and the like in the present specification is incorporated by reference.

What is claimed is:

1. A light emitting emblem comprising:
a board having a first peripheral edge;
a light source arranged at the first peripheral edge;
a light guide plate having a second peripheral edge and an inner side portion, the second peripheral edge having a first surface facing the light source and a second surface opposite to the first surface, the first surface including a light entering part into which light from the light source is incident, and the second surface including an inclination part through which the light incident into the light entering part is reflected to the inner side portion from the second peripheral edge; and
a shielding plate that shields the light from the light source and prevents light not incident from the light entering part from being incident into the inner side portion,
wherein the inclination part is positioned at an outer edge of the light emitting emblem from the shielding plate, and
wherein the light guide plate has the light entering part facing the light source on the first surface of the second peripheral edge of the light guide plate and the inclination part on the second surface of an opposite side.

2. The light emitting emblem according to claim 1, wherein the light entering part has a convex portion and a reflection portion, which is installed around the convex portion and reflects the light incident from the light source, and is positioned at the outer edge of the light emitting emblem from the shielding plate.

3. The light emitting emblem according to claim 2, wherein the inclination part and the reflection portion are directly continuous.

4. The light emitting emblem according to claim 1, wherein the shielding plate abuts on the light guide plate.

5. The light emitting emblem according to claim 1, wherein the inclination part is provided only at the outer edge of the light guide plate.

6. The light emitting emblem according to claim 1, wherein the second surface includes a single inclination part.

7. The light emitting emblem according to claim 1, wherein the light guide plate is symmetrical.

8. The light emitting emblem according to claim 1, wherein an optical axis of the light source is directed to the light entering part such that the light incident to the inclination part becomes parallel light in the light guide plate.

9. The light emitting emblem according to claim 1, wherein a part of the light entered into the light guide plate through the light entering part is reflected in a horizontal direction with respect to an optical axis of the light source by the inclination part.

10. The light emitting emblem according to claim 1, wherein the inclination part extends an entire length of the second surface.

11. The light emitting emblem according to claim 1, wherein light is reflected by the inclination part through the guide plate perpendicular to an optical axis of the light source such that the light leaks out through a front of the light guide plate parallel to the optical axis.

12. The light emitting emblem according to claim 1, wherein the inclination part extends inwardly up to a position of the shielding plate.

13. A light emitting emblem according to claim 1, further comprising:
a housing provided with the shielding plate.

14. A light emitting emblem according to claim 1, wherein the board has a through hole into which the shielding plate is inserted.

15. A light emitting emblem comprising:
a board having a first peripheral edge;
a light source arranged at the first peripheral edge;
a light guide plate having a second peripheral edge and an inner side portion, the second peripheral edge having a first surface facing the light source and a second surface opposite to the first surface, the first surface including a light entering part into which light from the light source is incident, and the second surface including an inclination part through which the light incident into the light entering part is reflected to the inner side portion from the second peripheral edge; and
a shielding plate that shields the light from the light source and prevents light not incident from the light entering part from being incident into the inner side portion, wherein the inclination part is positioned at an outer edge of the light emitting emblem from the shielding plate,
the light emitting emblem further comprising:
a housing provided with the shielding plate,
wherein the board has a through hole into which the shielding plate is inserted.

* * * * *